Dec. 11, 1956  H. W. HOARD ET AL  2,773,973
COMBINED LAMP GUARD AND SOCKET MOUNTING DEVICE
Filed June 19, 1953  2 Sheets-Sheet 1

Inventors
Halbert W. Hoard
Duane A. Olson
Thomas A. Vallee
By their Attorney

Dec. 11, 1956 H. W. HOARD ET AL 2,773,973
COMBINED LAMP GUARD AND SOCKET MOUNTING DEVICE
Filed June 19, 1953 2 Sheets-Sheet 2
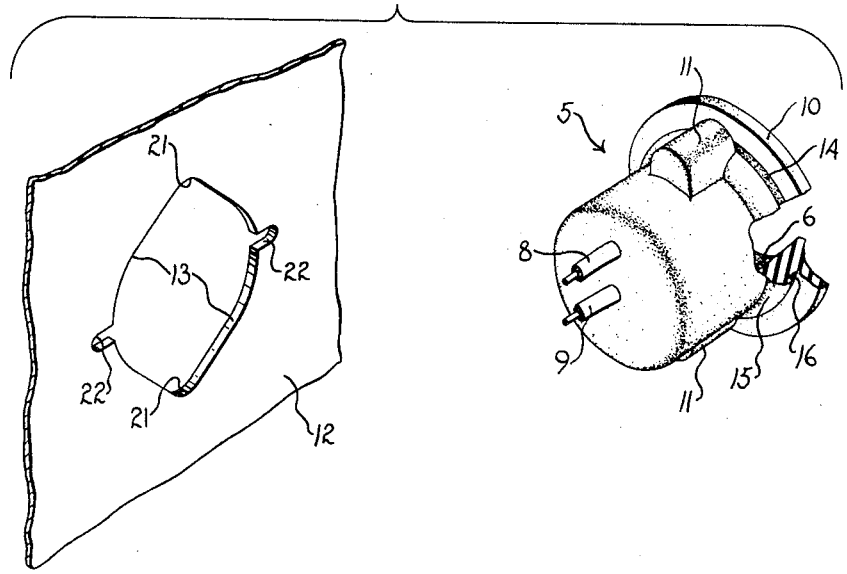
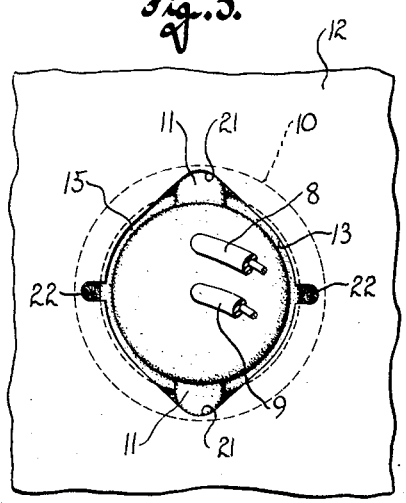
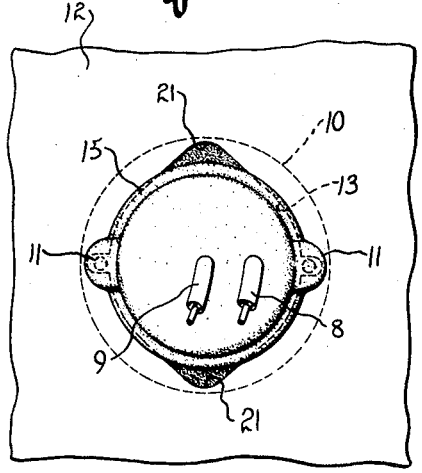
Inventors
Halbert W. Hoard
Duane A. Olson
Thomas A. Vallee
By
Attorney

United States Patent Office 2,773,973
Patented Dec. 11, 1956

2,773,973

COMBINED LAMP GUARD AND SOCKET MOUNTING DEVICE

Halbert W. Hoard, Scottsdale, Ariz., and Duane A. Olson and Thomas A. Vallee, Milwaukee, Wis., assignors to Unilectric, Inc., a corporation of Wisconsin Application June 19, 1953, Serial No. 362,742

1 Claim. (Cl. 240—4)

This invention relates to lamp sockets of the type used in ordinary household refrigerators and similar cabinets and refers particularly to the manner of mounting such sockets.

As is well known to those skilled in the art, the mounting of lamp sockets in refrigerators has progressed to the point where to be commercially feasible the sockets must be capable of being mounted by merely snapping them into place in a mounting hole in one of the inside walls of the refrigerator. The art has further progressed to the point where the bodies of the sockets in order to best meet this requirement are molded from rubber or the like so as to have a suitable degree of elasticity and, of course, the socket bodies must be so designed that when in position they will not only completely and tightly close the opening in which they are mounted but also will not turn in their mounting holes when lamps are screwed in or out.

These objectives have been fairly well achieved with the socket of the Design Patent No. 156,730 issued to Halbert W. Hoard on January 3, 1950, but in that case a diagonal placement of the socket body in the mounting hole was used to secure the socket against rotation. Hence, the socket had to be snapped into its mounting hole in the panel wihout the benefit of turning the socket during the operation. One of the two spaced flanges between which the edge of the hole in the panel fits when the socket is in place had to be forced through the hole which often required brute force.

This invention has as its object to provide an improved lamp socket and mounting therefor wherein the need for using great force in the mounting of the socket is eliminated through a novel application of the bayonet slot principle. Accordingly the socket of this invention is designed for direct and easy endwise or axial insertion into its mounting hole in an assembling and disassembling position of rotation and then turned to its intended position in which it is firmly secured against endwise displacement and fully seals the entire hole in the panel, and in which position it is "locked" by the simple expedient of attaching a wire lamp guard to the socket.

With the above and other objects in view, which will appear as the description proceeds, this invention resides in the novel construction, combination and arrangement of parts substantially as hereinafter described and more particularly defined by the appended claim, it being understood that such changes in the precise embodiment of the herein disclosed invention may be made as come within the scope of the claim.

The accompanying drawings illustrate one complete example of the physical embodiment of the invention constructed according to the best mode so far devised for the practical application of the principles thereof, and in which:

Figure 4 is a perspective view of a portion of the mounting panel showing the hole therein, and of the lamp socket in position about to be inserted into the hole, a part of the lamp socket being broken away and in section;

Figure 5 is a rear end view of the socket and panel with the socket in its assembling and disassembling position of rotation; and Figure 6 is a view similar to Figure 5 but showing the socket turned to its intended properly mounted position which in this case is 90° from its assembling and disassembling position.

Figure 1:
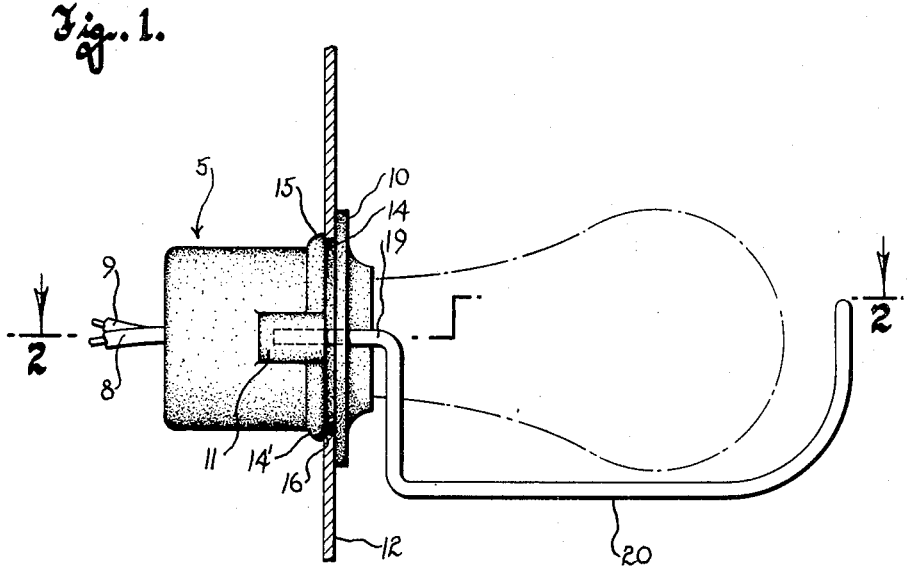
Figure 1 is a side elevational view of the lamp socket of this invention mounted upon a panel which is representative of an inside wall of a refrigerator or other cabinet.
Figure 2:
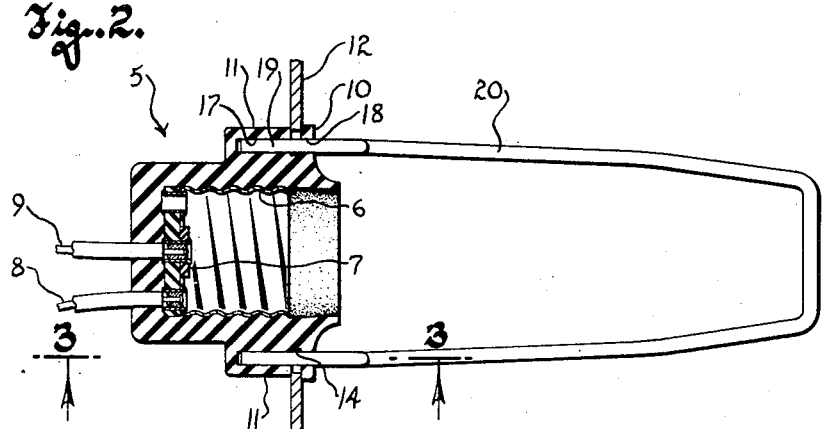
Figure 2 is a longitudinal sectional view through the assembly taken on the plane of the line 2—2 in Figure 1.
Figure 3:
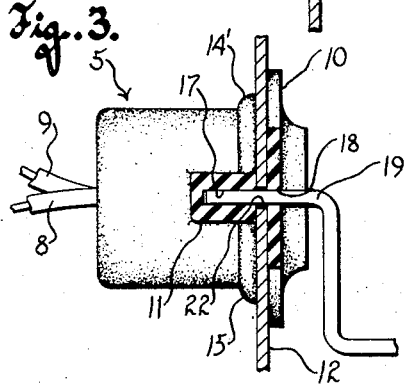
Figure 3 is a detail sectional view taken on the plane of the line 3—3 of Figure 2.

Referring now particularly to the accompanying drawings in which like numerals indicate like parts, the numeral 5 indicates generally the body of the lamp socket of this invention, which as stated is especially adapted for use in household refrigerators. The body 5 has the customary cup-shaped formation and is molded from rubber or the like. Within its interior is the usual threaded metal shell 6 into which a lamp may be screwed, and the customary center terminal 7 which connects with the center contact of the lamp.

Conductors 8 and 9 respectively lead to the shell 6 and the center terminal 7 and as is the practice in this art are molded into and protrude from the closed rear end of the socket.

The body of the socket 5 is substantially cylindrical and at its open end has an integral annular flange 10. Behind the flange 10 the body 5 has two diametrically opposite outwardly projecting lugs 11, the front ends of which lie in a common plane normal to the axis of the socket and spaced rearwardly of the underside of the flange 10 a distance substantially corresponding to the thickness of the panel 12 upon which the socket is to be mounted. When the socket is in position on the panel the edge portion of its hole 13 is confined between the flange 10 and the lugs 11.

That portion 14 of the socket body lying between the flange 10 and the lugs 11 is substantially cylindrical and slightly larger in diameter than the rest of the body, and directly rearwardly of this cylindrical portion 14 and extending between the lugs 11 is a flange 15. This flange 15 is much narrower than the flange 10 and only silghtly larger in diameter than the cylindrical portion 14. Hence, the shoulder 16 which it provides is quite narrow, and though it forms extensions of the front ends of the lugs 11 and thus assists in securing the socket body against endwise displacement, its chief purpose is to coact with the flange 10 to seal the hole.

The lugs 11 and the directly overlying portions of the flange 10 have aligned holes 17 and 18 to receive the attaching end portions 19 of a wire lamp guard 20. As will be later described, the attaching ends 19 of the lamp guard provide spaced parallel prongs of a diameter to tightly fit into the holes 17 and 18 to not only detachably mount the lamp guard on the front of the panel in protective relationship to a lamp bulb in the socket, but to also lock the lamp socket in place upon the panel.

The hole 13 in the panel is a size and shape corresponding generally to the cross section of the socket body on a transverse plane through its lugs 11. Hence, the hole is generally round with a diameter substantially equal to that of the cylindrical portion 14 of the socket body, but at diametrically opposite points it is enlarged as at 21 to accommodate the lugs 11. The slight difference in diameter between the flange 15 and the hole 13 is not sufficient to prevent the socket being easily snapped into the hole provided the socket is in its assembling position shown in Figure 5 in which position its lugs 11 align with the diametrically opposite enlargements 21. To facilitate the passage of the flange 15 through the hole its rear portion is curved as at 14'.

Upon insertion of the socket into the hole 13 the underside of the flange 10 bears against the front face of the panel so that the panel aligns with the cylindrical portion 14 of the socket body between the flange 10 and the aligned front faces of the lugs 11 and the flange 15. Consequently the socket may be turned from its assembling and disassembling position to a position at which the holes 17 and 18 in the lugs and flange 10 align with diametrically opposite notches 22 in the edge of the hole 13. These notches are but slightly larger than the holes 17 and 18, and upon such alignment and the rearward insertion of the prongs 19 of the lamp guard 20 into the holes and their passage through the notches 22 the socket is secured against rotation. In instances where no lamp guard is needed or where its presence may be objectionable, small pins can be substituted for the lamp guard portions 19. In either case the tendency for the socket body to turn when a lamp is screwed in or out is resisted in a simple and direct manner and accidental rotation of the socket body to its disassembling position is prevented.

From the foregoing description taken in connection with the accompanying drawings, it will be readily apparent that this invention provides a lamp socket and manner of mounting the same which is particularly well adapted for use in household refrigerators and that it affords a good moisture-proof seal with the panel upon which it is mounted, is easily assembled with the panel and when assembled is secured against accidental and objectionable rotation by the simple expedient of attaching the wire lamp guard to the socket body.

What we claim as our invention is:

In combination with a panel having a hole therein which is widened at opposite edge portions, and having a pair of apertures therein adjacent to the edge of said hole at diametrically opposite locations which are spaced from said widened portions of the hole, means for mounting a lamp bulb on the panel, comprising: a lamp socket having a cup-shaped body portion rotatably received in and projecting rearwardly through the hole in the panel, the interior of said cup-shaped body portion opening to the front of the panel and being adapted to receive the base of a lamp bulb to mounted the bulb on the panel in a position projecting forwardly therefrom; an integral annular flange on the socket surrounding the front of the body portion and providing a flat rearwardly facing annular shoulder engaging the front face of the panel around the edge of the hole therein; a pair of diametrically opposite lugs on opposite sides of the socket body engaging rear portions of the panel over said apertures therein and cooperating with said flange to clamp the panel therebetween and thus hold the socket against axial displacement from the hole in the panel except upon rotation of the socket to a detaching position at which said lugs register with the widened portions of the panel hole, and at which detaching position the body portion of the socket may be drawn axially forwardly through the hole in the panel, said lugs and the flange having aligning holes therein which register with said apertures in the panel; and a lamp guard for protecting a lamp bulb in the socket and for locking the socket against rotation in the panel hole toward said detaching position of the socket, said lamp guard comprising a substantially U-shaped wire member having a portion remote from the panel to protectively cover the end of a lamp bulb in said socket, and having a pair of spaced apart parallel prongs on its inner end projected rearwardly into and snugly but detachably fitting said holes in the flange and lugs, said prongs passing through said apertures in the panel to thus preclude rotation of the socket in the panel hole except upon forward withdrawal of the lamp guard prongs from said holes in the flange and lugs.

References Cited in the file of this patent
UNITED STATES PATENTS

| | | |
|---|---|---|
| 984,561 | Hochhausen | Feb. 21, 1911 |
| 1,098,973 | Reich | June 2, 1914 |
| 2,152,468 | De Reamer | Mar. 28, 1939 |
| 2,460,636 | Holloway | Feb. 1, 1949 |
| 2,620,375 | Valites | Dec. 2, 1952 |